R. E. RUDOLPH.
BRAKE.
APPLICATION FILED JULY 7, 1908.
930,234.
Patented Aug. 3, 1909.
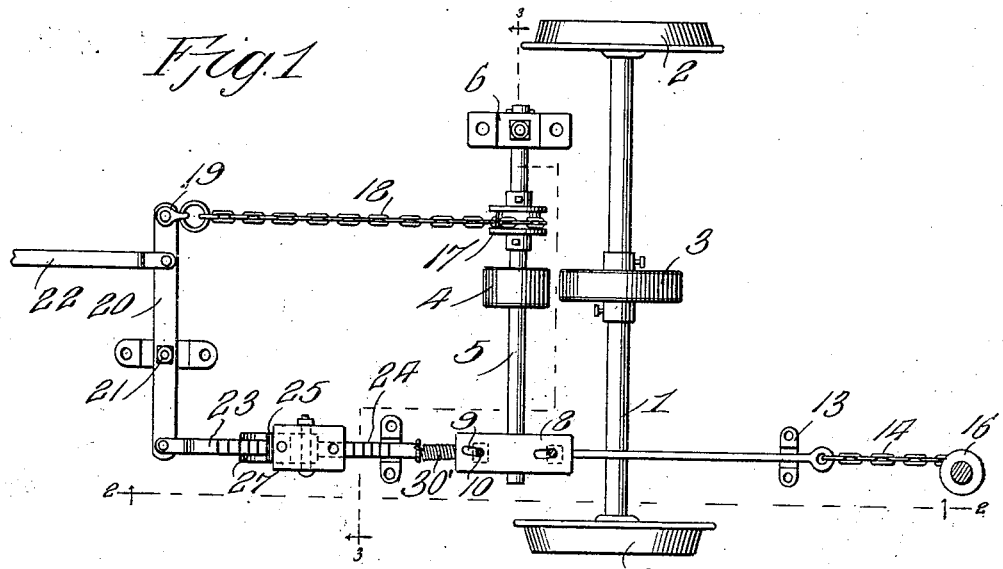
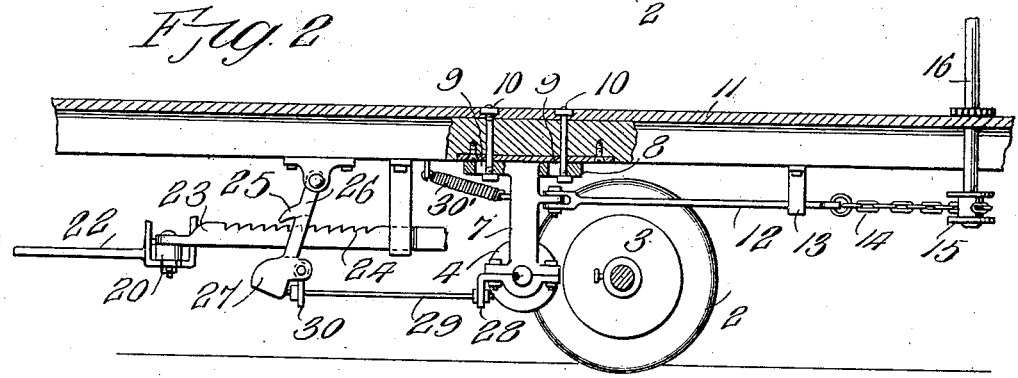
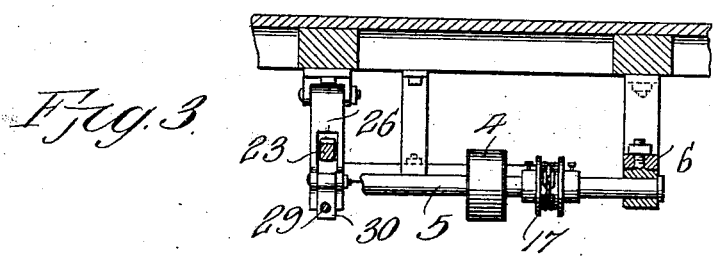
Witnesses
Frank Hough.
R. M. Smith.
Inventor
Robert E. Rudolph,
By Victor J. Evans
Attorney

UNITED STATES PATENT OFFICE.

ROBERT E. RUDOLPH, OF PADUCAH, KENTUCKY.

BRAKE.

No. 930,234.　　　Specification of Letters Patent.　　　Patented Aug. 3, 1909.

Application filed July 7, 1908. Serial No. 442,426.

*To all whom it may concern:*

Be it known that I, ROBERT E. RUDOLPH, a citizen of the United States, residing at Paducah, in the county of McCracken and State of Kentucky, have invented new and useful Improvements in Brakes, of which the following is a specification.

This invention relates to brakes, the object in view being to provide a brake applicable either to single or double truck cars by means of which the brake mechanism may be operated through the medium of friction gears actuated by one of the axles of the car in connection with means under the control of the motorman for throwing the brakes into and out of operation.

A further object of the invention is to provide in connection with such brake, means which automatically sets itself during the initial application of the brakes and subsequently operates to hold the brakes set with any desired pressure after the brake handle has been released or partially released by the motorman, the construction permitting the motorman to complete the release of the brakes preparatory to starting the car again or whenever he desires.

With the above and other objects in view, the nature of which will more fully appear as the description proceeds, the invention consists in the novel construction, combination and arrangement of parts as herein fully described, illustrated and claimed.

In the accompanying drawings:—Figure 1 is a plan view of the brake mechanism of this invention, showing the same combined with a car axle. Fig. 2 is a longitudinal sectional view of the brake mechanism shown applied to a car body. Fig. 3 is a vertical transverse section taken in line with the friction wheel shaft.

Referring to the drawings, 1 designates a rotary car axle equipped with the usual wheels 2.

In carrying out the present invention, a friction wheel 3 is mounted fast on the axle 1 so as to rotate therewith and arranged in line with the wheel 3 and adapted to coöperate therewith and be driven thereby is another friction wheel 4 which is fast on a friction wheel shaft 5 normally parallel or substantially so with the axle 1, the shaft 5 being mounted at one end in a fixed bearing 6 while the opposite end thereof is adapted to be shifted toward and away from the axle 1. For this purpose, I provide a shiftable or sliding hanger 7 having a cap portion 8 which is provided with slots 9 receiving bolts 10 which connect the hanger with the car body illustrated at 11 but permit said hanger to move in a direction lengthwise of the car body so as to render it practical to move the shaft 4 toward and away from the axle 1 in order to shift the friction wheel 5 into and out of engagement with the wheel 3. Connected to one side of the hanger 7 is a rod 12 which passes through one or more suitable guides 13 and has its forward end connected to a chain 14 which winds upon a drum 15 on the brake staff 16 so that the motorman by turning the brake staff 16 may wind up the chain 14 and draw the hanger 7 toward the axle 1 thereby moving the friction gears 4 and 3 into engagement with each other.

Fast upon the shaft 5 is a drum or pulley 17 around which is wound a chain, the projecting end of which is pivotally connected at 19 to a brake lever 20 fulcrumed at 21 on a bracket secured to the car brake or body at a convenient point. Connected to the lever 20 between the chain attaching point 19 and the fulcrum point 21 is a brake connection 22 which leads to the brake beam (not shown), said brake beam carrying the usual shoes which bear against the treads of the wheels.

Connected to the opposite end of the lever 20 is a rack bar 23 which is shown in Fig. 2 as provided on its upper side with rack teeth 24 adapted to be engaged by the pawl 25 on a pawl carrying arm 26 provided with a weight 27 at its lower end, the weight operating to move the pawl carrying arm to a position in which the pawl 25 will engage the teeth of the rack and prevent the same from sliding toward the axle 1 after it is drawn away from the axle through the operation of the lever 20.

The shaft hanger 7 is provided with a pendent lug or extension 28 to which is connected one end of a drum relief rod 29 the opposite end of which is connected to a rack or extension 30 in the pawl carrying arm 26. 30′ designates a spring interposed between the shaft hanger 7 and a fixed point on the car body, said spring acting to draw the shaft 5 away from the axle 1 thereby moving the wheel 4 out of frictional engagement with the wheel 3 and releasing the brakes in operation, when the brake staff 16 is turned, the shaft cylinder 7 is moved toward the axle 1 thereby carrying the wheel 4 into frictional engagement with the wheel 3. The rotary motion of the axle 1 is thus transmitted to the shaft 5 and the latter in turn winds up the chain 18 thereby operating the drum lever 20 and applying the brakes. At the same time the rack 23 is moved by the lever and is caught and held by the pawl 25. This relieves the motorman from the necessity of holding the brake handle as the brakes will remain applied as long as the pawl 25 is in engagement with the rack bar 23. To release the brakes entirely, the motorman reverses the brake handle which gives slack to the chain 14 and allows the spring 30 to move the wheel 4 away from the wheel 3. In such rearward movement of the shaft cylinder 7, the relief rod 29 swings the lower end of the pawl carrying lever 26 in such direction as to move the pawl 25 out of engagement with the rack bar 23, which then returns to its inoperative position.

I claim:—

1. Brake mechanism comprising a car axle, a friction wheel fast thereon, a friction wheel shaft substantially parallel with the car axle, a friction wheel fast on said shaft, a horizontally slidable shaft hanger, means under the control of the motorman for sliding said hanger toward and away from the car axle, brake connections including a brake lever, a chain connected to said lever and adapted to be wound upon the friction wheel shaft, a rack bar pivotally connected with said brake lever, and a pawl for holding and releasing said rack bar.

2. Car brake mechanism comprising a rotary car axle, a friction wheel fast on said axle, a friction wheel shaft substantially parallel to the axle, a friction wheel fast on said shaft, means under the control of the motor-man for shifting the friction wheel shaft toward and away from the axle and effecting an engagement and non-engagement between the two friction wheels, brake connections including a brake lever, a chain extending from said lever to the friction wheel shaft and adapted to be wound up by the latter, a rack bar connected with said brake lever, a counter-balanced pawl movable into and out of engagement with said rack bar, and an adjustable pawl operating connection actuated by the movement of the shaft.

3. The combination of brake mechanism and means for setting and locking the same, said means including a sliding rack, a pawl adapted to engage therewith, connections between said rack and the brake mechanism, and connections which when set in operation, will cause the movement of said rack by the rotation of the car wheels, substantially as described.

4. The combination of brake mechanism, means for setting said brake mechanism, and means for locking said brake mechanism when set, said latter means including a toothed sliding rack adapted to be operated by the rotation of the car wheels, and a pawl adapted to engage said rack, substantially as described.

5. The combination of brake mechanism, means for setting said brake mechanism including a sliding toothed rack, and connections between said rack and said mechanism, a toothed pawl engaging said rack, means operated by the car axle for moving said rack, devices operated by the brakeman for the setting of said means in operation, and devices for disengaging said pawl from said rack, substantially as described.

In testimony whereof I affix my signature in presence of two witnesses.

ROBERT E. RUDOLPH.

Witnesses:
  JOHN R. HAWKINS, Jr.,
  CHARLEY WATT.